United States Patent

[11] 3,591,972

[72] Inventor Louis Michael Hess
  325 26th Ave. Apt. 302, San Francisco, Calif. 94121
[21] Appl. No. 859,772
[22] Filed Sept. 22, 1969
[45] Patented July 13, 1971

[54] VERMIN EXTERMINATOR FOR SHIPBOARD USE AND FOR USE IN BUILDINGS, ETC.
4 Claims, 2 Drawing Figs.
[52] U.S. Cl. ..................................................... 43/58
[51] Int. Cl. ............................................A01m 23/16
[50] Field of Search........................................... 43/58, 61, 77, 86, 60, 110, 111, 124

[56] References Cited
UNITED STATES PATENTS
1,370,327  3/1921  Linz, Jr. ........................ 43/58
3,528,190  9/1970  Voorhees ...................... 43/58

Primary Examiner—Warner H. Camp
Attorney—Julian Caplan

ABSTRACT: A pair of interfitting tubes are formed with entrance holes which are aligned in one position for entry of vermin. The tubes may be moved relative to each other to close off entry. Water flushes vermin trapped in the tubes out the end and into the sea. The tubes may be round, square or rectangular, a smaller tube sliding longitudinally with a larger one.

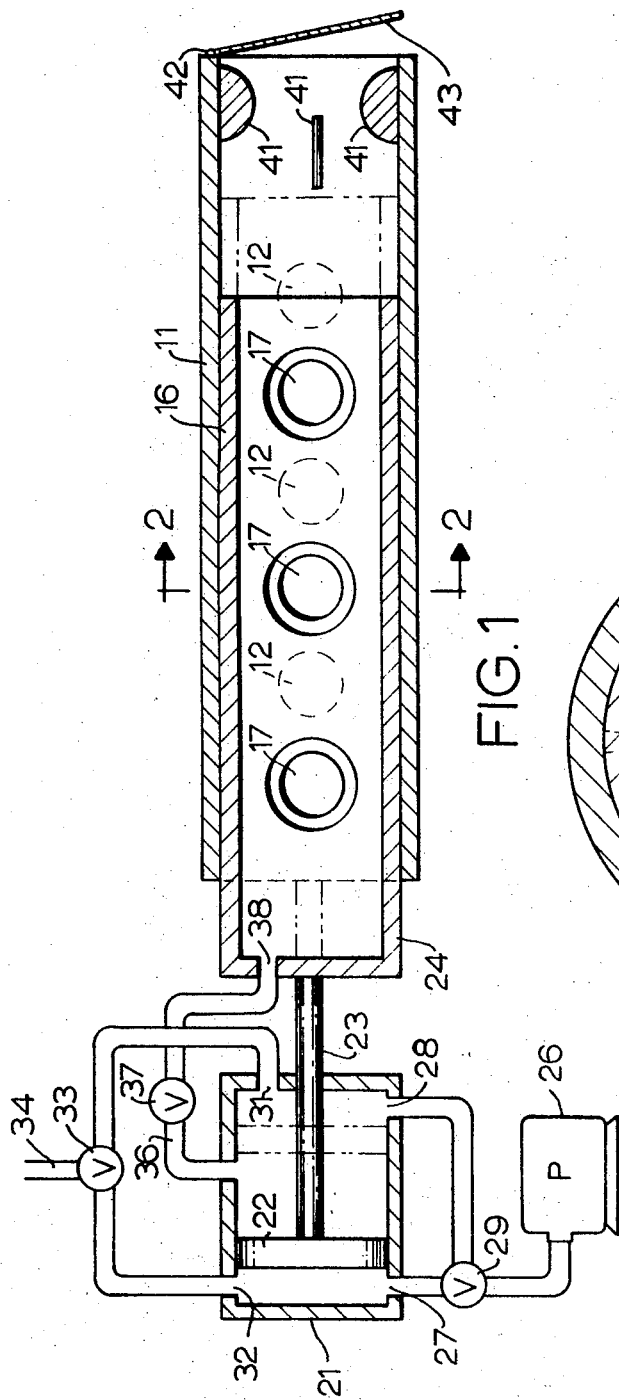
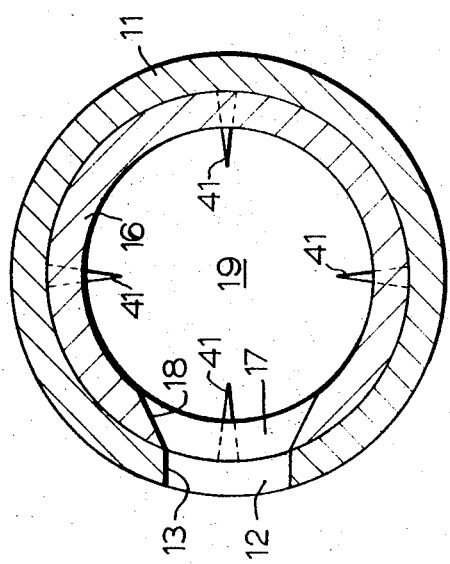

VERMIN EXTERMINATOR FOR SHIPBOARD USE AND FOR USE IN BUILDINGS, ETC.

This invention relates to a new and improved vermin exterminator particularly useful on ships and in other installations where water may be used to flush vermin into the sea or into sewers or other conduits where disposal creates no problem.

A principal purpose of the present invention is to provide a convenient and humane means for disposal of vermin.

One of the features of the invention is the fact that no poisons, exterminator gases or the like which create problems with domestic animals and humans are employed. Hence, safety is one of the advantages of the present invention.

Another feature of the invention is the fact that there is no re-loading of spring-type traps required. Such traps require labor and also are extremely unpleasant to personnel.

One other feature of the invention is that vermin are disposed of by flushing into the sea or a sewer thereby relieving personnel of the need of collecting and disposing of the dead vermin.

A still further feature of the invention is the fact that there are no odors created in use of the device whereas in previous devices where the dead vermin are left unattended for periods of time serious odor problems occur.

Other objects of the present invention will become apparent upon reading the following specification and referring to the accompanying drawings in which similar characters of reference represent corresponding parts in each of the several views.

In the drawings:

FIG. 1 is a partially schematic sectional view through the device; and

FIG. 2 is an enlarged transverse sectional view taken substantially along the line 2—2 of FIG. 1.

The device shown in the accompanying drawings comprises a first or outer tube or pipe 11 which is formed at intervals with holes 12. Fitting inside tube 11 is a tube 16 which will slide or rotate relative to tube 11. The tube 16 is formed with holes 17 of slightly lesser size than the holes 12 and spaced apart the same distance. The edges 18 of holes 17 are beveled. As hereinafter explained, tube 16 may be caused to slide axially relative to tube 11 or may rotate relative thereto. In one position of tube 16, the holes 17 are aligned with the holes 12 so that vermin may enter the interior of tube 16, to reach the interior 19 which comprises a trap compartment which is preferably baited by a vermin attracting bait, such as a lubricant containing attractive scent or substance, or a spray or oil of attractive nature, etc. When the tube 16 is shifted relative to tube 11, as shown in FIG. 1, the holes 12 are closed trapping vermin inside the area 19. Holes 12, 17 may be positioned along one side or on the top or two sides of the device or in other arrangement, as desired, so that free access to the trap is provided.

A convenient means for shifting tube 16 is illustrated in the left hand end of FIG. 1, it being understood that other means such as manually activated levers, motors and the like may be substituted. As shown in FIG. 1, a cylinder 21 is provided in which reciprocates a piston 22 having a rod 23 connected to the head 24 of tube 16. Pump 26 delivers water (such as sea water or bilge water) under pressure alternately into the ports 27, 28 at opposite ends of cylinder 21 under the control of valve 29. Thus by turning three-way valve 29, the piston 21 may be caused to reciprocate in cylinder 21. The discharge of water from ports 31, 32 is controlled by valve 33 for discharge of the water through outlet 34. It will be understood, of course, that valves 29 and 33 are operated simultaneously as is well understood in the valve art.

A conduit 36 may be installed in cylinder 21 having a valve 37 therein which leads to a port 38 in the head 24. Hence when the piston 22 has shifted tube 16 relative to tube 11 so that the entry holes 12 are blocked off, as is shown in dot and dash position in FIG. 1, valve 37 may be opened and water delivered by pump 26 flushes out the tube 16. Vermin trapped in tube 16 are forced out of the tube 16 and to the discharge end of tube 11 which may lead to the sea, a sewer or the like. Preferably adjacent the discharge end of tube 11 are a series of thin, sharp-edged blades 41 which are staggered and project radially into the interior of tube 11 so that as the vermin are flushed along the tube 11 they come in contact with the blades 41 and are sliced so that they cannot crawl back up the pipe 11, and will be rendered incapable of swimming well, thus drowning easily or be weakened from loss of blood.

A trap door 43 hinged by means of hinge 42 at the top of the discharge end at pipe 11 is forced open by flow of water from tube and forced closed by sea water or a spring (not shown) if used on land.

What I claim is:

1. A vermin exterminating apparatus comprising a first tube formed with at least one first hole, a second tube slidably positioned within said first tube and having a second hole, means for shifting said tubes relative to each other between a first position with said holes aligned to a second position with said first holes closed off, and means for flushing water through said tubes, one said tube being elongated to discharge vermin flushed therethrough to the sea, a sewer or the like.

2. Apparatus according to claim 1 which further comprises sharp blades extending into said elongated tube to slice vermin flushed therealong.

3. Apparatus according to claim 1 in which said first-mentioned means comprises a cylinder having a double-acting piston, means connecting said piston to move one of said tubes relative to the other and means for delivering water under pressure to opposite ends of said cylinder.

4. Apparatus according to claim 3 in which said second-mentioned means is connected to receive water discharged from said first-mentioned means.